United States Patent [19]
Moore, III

[11] Patent Number: 5,255,951
[45] Date of Patent: * Oct. 26, 1993

[54] FOLDING SIDE RACKS FOR PICKUP TRUCKS

[76] Inventor: Byrd L. Moore, III, 151 Blue Island St., Fairhope, Ala. 36532

[*] Notice: The portion of the term of this patent subsequent to Aug. 19, 2008 has been disclaimed.

[21] Appl. No.: 487,617

[22] Filed: Mar. 2, 1990

[51] Int. Cl.5 ............................................... B60P 3/00
[52] U.S. Cl. ..................................... 296/3; 224/42.42
[58] Field of Search .................... 296/3; 224/45.45 R, 224/42.43, 42.44, 42.42 R, 42.38

[56] References Cited

U.S. PATENT DOCUMENTS

| | | | |
|---|---|---|---|
| 3,649,041 | 3/1972 | Cervantez | 224/42.44 |
| 3,891,262 | 6/1975 | Brunel | 296/3 |
| 4,398,763 | 8/1983 | Louw | 296/3 |
| 4,751,981 | 1/1988 | Mitchell et al. | 224/42.43 |

Primary Examiner—Robert R. Song

[57] ABSTRACT

A folding side carrier rack consisting of a pair of pivotally mounted arms situated along the truck box located on the passenger side. Each rack is stored in a folding position on the inside of the front body and the inside of the tail gate. When needed for load carrying, the racks are pivoted outboard; the cargo retaining posts are raised from their stored position to the vertical; racks are stored by the reverse procedure.

2 Claims, 2 Drawing Sheets

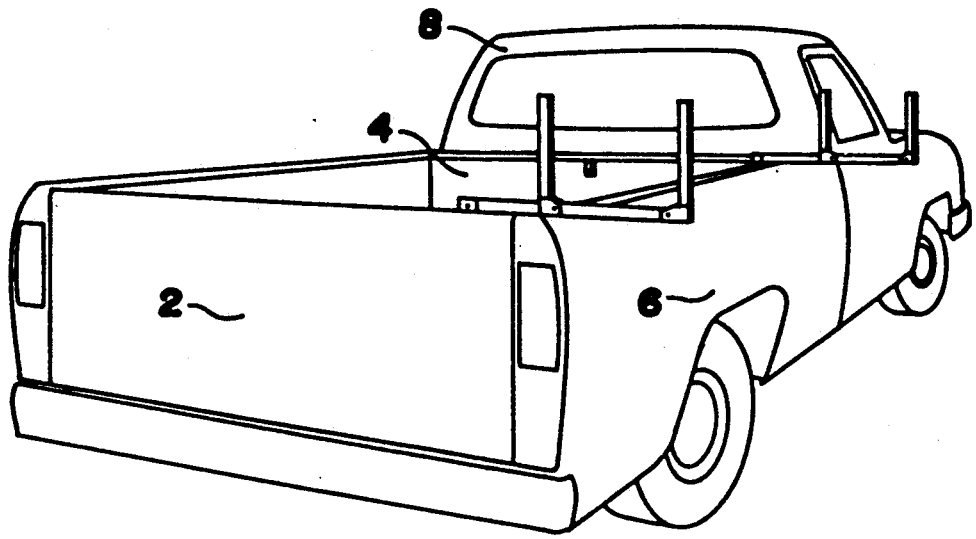
FIG. 1
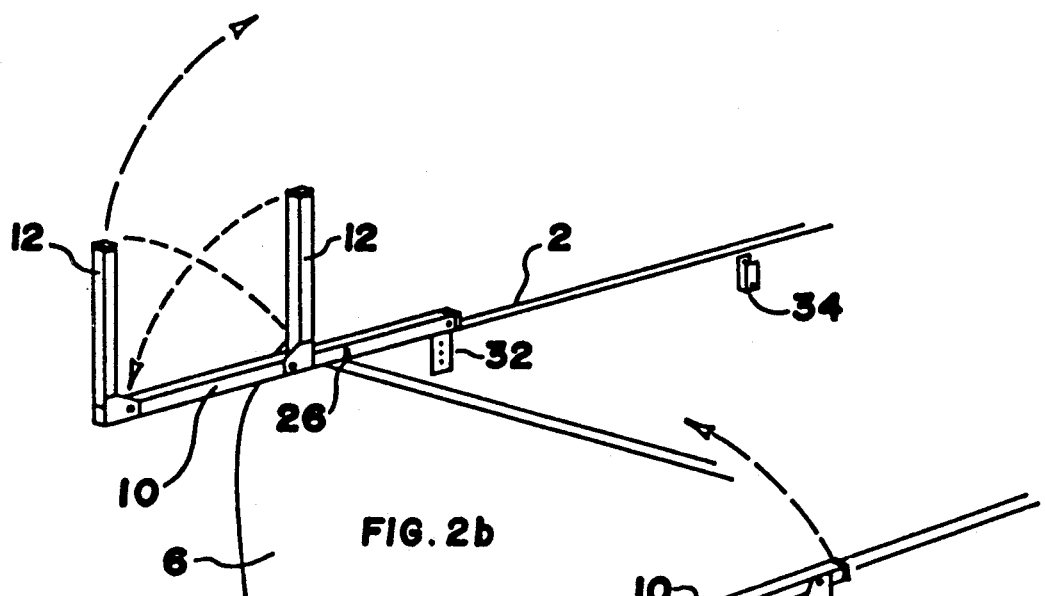
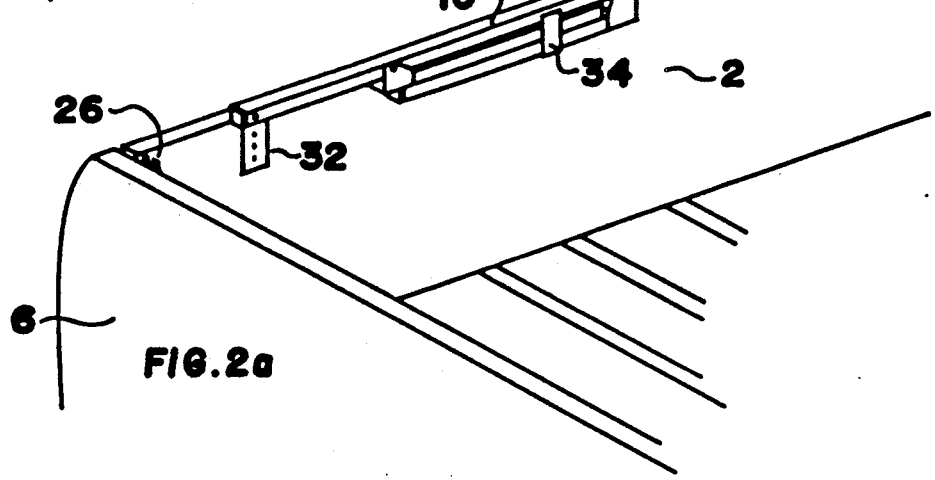
FIG. 2b
FIG. 2a

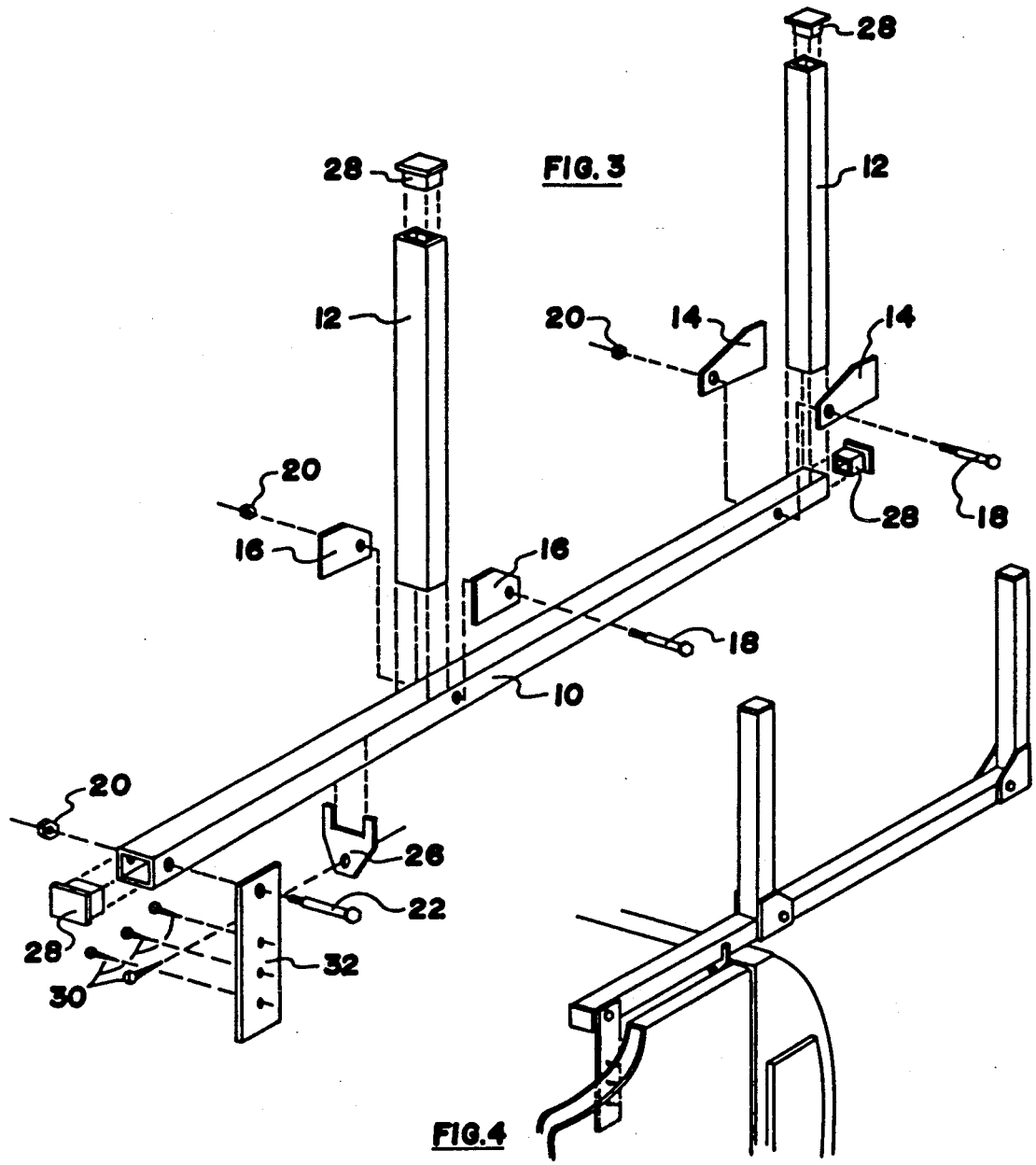

ND SIDE RACKS FOR PICKUP TRUCKS

REFERENCES CITED

| 3,649,041 | 3/19/70 | Cervantez |
|---|---|---|
| 3,891,262 | 12/17/73 | Brunel |
| 4,398,763 | 7/02/81 | Louw |
| 4,751,981 | 10/02/87 | Mitchett et al. |

BACKGROUND OF THE PRESENT INVENTION

This invention pertains generally to side racks for pickup trucks for transporting equipment and/or materials.

Truck racks have been used since pickup trucks were first introduced. Traditionally, top racks and side racks have been used to transport materials and/or equipment too long to be carried in the average pickup truck bed. Most top and side racks, until recently were the creation of the installer and permanently affixed to the pickup truck. Today's pickup truck has become a dual purpose vehicle used for both work and pleasure. In fact, pickup trucks are now used much in the same manner and purpose as suburban station wagons. For this reason, there has been a number of inventions pertaining to removable and/or retractable top racks. But, to date, there is no wide use of side racks, nor till now has there been any satisfactory or practical way to remove or store same.

SUMMARY OF THE INVENTION

The purpose of this invention is to introduce sturdy mechanisms which can be pivoted to the outboard side of a pickup truck to function as load carrying side racks. When not in use, each rack is neatly folded and pivoted inboard to be stored, for the most part, out of sight.

The object of the present invention is to provide side racks for nearly all pickup trucks which will enable handling of long loads; another object is that the racks are relatively inexpensive, easy to mount and stored out of sight when not in use. Another object is to provide side racks which can be readied for use by one person in seconds and stored in like time. Still another object is to provide a load carrier which is aesthetically compatible with nearly all pickup trucks, yet is sturdy, lightweight and virtually maintenance free. While still another object is to provide load carrying racks, when in the stored position, that do not interfere with the normal load carrying design of pickup trucks.

BRIEF DESCRIPTION OF THE DRAWINGS

FIG. 1 is a perspective view of a pickup truck with the folding side racks A and B ready for use.

FIG. 2 is perspective views of B side rack depicting the method of folding and storage of same.

FIG. 3 is a perspective view of B side rack depicting the various parts and assembly.

FIG. 4 is a perspective view of B side rack, affixed to the tail gate of a pickup truck, in the outboard position.

REFERENCE NUMERALS IN DRAWINGS

2 - tail gate
4 - front of body
6 - side of body
8 - truck cab
10 - arm
12 - post
14 - outboard pivot tabs -continued 16 - inboard pivot tabs
18 - pivot bolts
20 - self-locking nuts
22 - arm pivot bolt
26 - positioning clip
28 - plug
30 - threaded fasteners
32 - arm pivot plate
34 - retaining clip

DETAILED DESCRIPTION OF THE PREFERRED EMBODIMENT

The invention consist of two identical folding racks, one right-hand and one left-hand, so that only one rack will be described. FIG. 1 illustrates a pickup truck with the side racks in the outboard positions (ready for use), the reference numerals indicating generally, 2, a pickup truck tail gate, 4, the front bed wall, 6, the side wall and 8, the truck cab. Referring to FIG. 3, the numerals 10 through 34 depict the rack parts as next described. The load carrying arm 10 is sicured at the pivot point on the arm pivot plate 32 by a bolt 22 and a self-locking nut 20. The arm pivot plate 32 is secured by three threaded fasteners 30 and the positioning clip 26 is secured in place by one threaded fastener 30. The positioning clip 26 holds the arm 10 in a secure lateral position while the top of the side 6 supports the arm 10 when loaded. When in use, the load retaining posts 12 are pivoted to the vertical on bolts 18 with self-locking nuts 20. Post 12 stands upright because of being pivoted off center by means of the pivoting tabs 14 and 16. Plugs 28 are used as shown to keep water from the inside of the assembly and to give the rack a finished look. To retract the folding rack, one has only to fold both posts 12 inward on the arm 10, then pivot the arm assembly 180 degrees in towards the front of body 4 and the tailgate 2 seating the assemblys in the retaining clips 34.

I claim:

1. A folding side rack for a pickup truck comprising:
   a. a flat pivot plate secured to the inside surface of the tailgate of a truck body by a plurality of threaded fasteners:
   b. with an arm pivotally attached to said pivot plate by means of a threaded bolt and a self-locking nut and moveable from a first stored position, wherein it is approximately horizontal, to a second load carrying position approximately 180 degrees from the first;
   c. lateral bracing achieved by use of a positioning clip permanently attached to the inside of the truck body, the arm adapted to rest in said clip when pivoted into the load carrying position;
   d. two posts which are in a first stored position horizontally along the arm and pivotally secured by threaded bolts and self-locking nuts to said arm, then raised to a second load retaining position wherein they are held in an approximate vertical position due to the off center pinning, on the arm, by pivot tabs which are permanently affixed to the posts.

2. A folding side rack for a pickup truck as described in claim 1 comprising:
   a. a second rack consisting of elements a through d of claim 1 and,
   b. said second rack being secured on the inside surface of the front wall of the truck bed to be aligned with the rack as described in claim 1, so as to permit elongated loads to be supported along side of the body and cab of a pickup-type vehicle.

* * * * *